(12) United States Patent
Terasawa et al.

(10) Patent No.: US 12,505,480 B2
(45) Date of Patent: Dec. 23, 2025

(54) SERVER

(71) Applicant: TOYOTA JIDOSHA KABUSHIKI KAISHA, Toyota (JP)

(72) Inventors: Yuko Terasawa, Tokyo-to (JP);
Makoto Kakuchi, Toyota (JP);
Toshiaki Karasawa, Tokyo-to (JP);
Takeshi Higashi, Nagoya (JP);
Yoshihiko Endo, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 121 days.

(21) Appl. No.: 18/516,568

(22) Filed: Nov. 21, 2023

(65) Prior Publication Data
US 2024/0177229 A1    May 30, 2024

(30) Foreign Application Priority Data

Nov. 30, 2022    (JP) .................................. 2022-191184

(51) Int. Cl.
*G06Q 30/00*    (2023.01)
*G06F 8/65*    (2018.01)
*G06Q 30/0645*    (2023.01)

(52) U.S. Cl.
CPC ........... *G06Q 30/0645* (2013.01); *G06F 8/65* (2013.01)

(58) Field of Classification Search
None
See application file for complete search history.

(56) References Cited

U.S. PATENT DOCUMENTS

| 2007/0287415 A1* | 12/2007 | Yamada | G06Q 10/10 455/406 |
| 2012/0077534 A1* | 3/2012 | Matsuo | H04W 76/23 455/509 |
| 2014/0201090 A1* | 7/2014 | Liang | B60L 58/21 324/426 |

(Continued)

FOREIGN PATENT DOCUMENTS

JP    2002-269407 A    9/2002

OTHER PUBLICATIONS

Electricity Charge Saved for Industrial and Commercial Utilizing Cloud Energy Storage Services. Authors: Lulu Jiang, Renjun Zhou, Jiangsheng Zhu, Jian Xu, Yanyan Xu. Published in: 2019 IEEE 3rd Conference on Energy Internet and Energy System Integration (EI2) (2019, pp. 1113-1116). (Year: 2019).*

(Continued)

*Primary Examiner* — Matthew T Sittner
(74) *Attorney, Agent, or Firm* — Sughrue Mion, PLLC

(57) ABSTRACT

A server is configured to communicate with a vehicle. The vehicle includes a battery and a storage unit for storing software. The server includes a communication device and a processing device. The communication device is configured to perform wireless communication with the vehicle. The processing device is configured to be capable of executing update processing for updating the software via the wireless communication. A first owner (user) as an owner of the vehicle has entered into a first lease contract for leasing the battery. When the owner has been changed from the first owner to a second owner and the second owner enters into a second lease contract for leasing the battery, the processing device permits the update processing.

12 Claims, 9 Drawing Sheets

(56) References Cited

U.S. PATENT DOCUMENTS

| | | | | |
|---|---|---|---|---|
| 2015/0347121 | A1* | 12/2015 | Harumoto | G06F 8/65 |
| | | | | 717/172 |
| 2016/0232736 | A1* | 8/2016 | Holtappels | H01M 50/514 |
| 2019/0197608 | A1* | 6/2019 | Iwai | G06Q 30/0645 |
| 2019/0251575 | A1* | 8/2019 | Berti | G06Q 30/018 |
| 2020/0334722 | A1* | 10/2020 | Kurimoto | G06Q 30/0284 |
| 2020/0394667 | A1* | 12/2020 | Kawashima | G06N 5/01 |
| 2023/0139986 | A1* | 5/2023 | Marotta | G06Q 30/0611 |
| | | | | 705/4 |
| 2024/0186800 | A1* | 6/2024 | Hiratsuka | B60L 53/68 |
| 2024/0259198 | A1* | 8/2024 | Lindberg Nilsson | H04W 4/02 |

OTHER PUBLICATIONS

Research on allocation and economy of energy storage demonstration projects in Shandong Province. Authors: Shipeng Wang • Tong Chen • Yurong Xie • Yuhao Zhou • Lili Liu. Published in: 2021 IEEE Sustainable Power and Energy Conference (iSPEC) (2021, pp. 1094-1099). (Year: 2021).*

* cited by examiner

| VEHICLE ID | USER ID (OWNER ID) | COMMUNICATION ADDRESS |
|---|---|---|
| 001 (VEHICLE 100) | 00A (U1) | ad-001 |
| 002 | 00B | ad-002 |
| 003 | 00C | ad-003 |
| ... | ... | ... |

| VEHICLE ID | REGISTERED OWNER ID |
|---|---|
| 001 (VEHICLE 100) | 00D (U2) |
| 002 | 00B |
| 003 | 00C |
| ... | ... |

FIG.8

| USER ID | JANUARY | FEBRUARY | MARCH | APRIL |
|---|---|---|---|---|
| 00A (U1) | DEBITED | NOT YET DEBITED | NOT YET DEBITED | NOT YET DEBITED |
| 00B | DEBITED | DEBITED | DEBITED | DEBITED |
| ... | ... | ... | ... | ... |

550

554

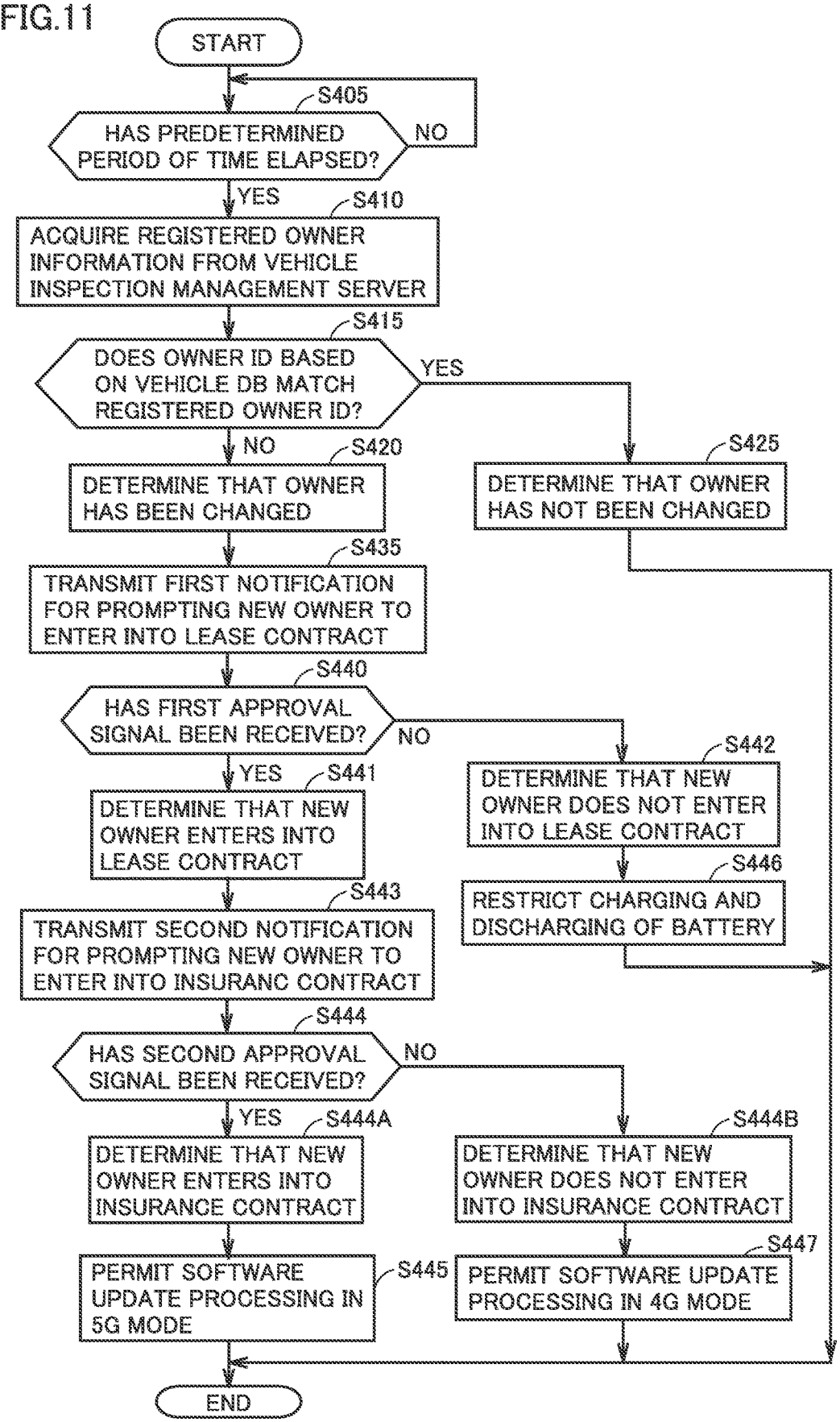

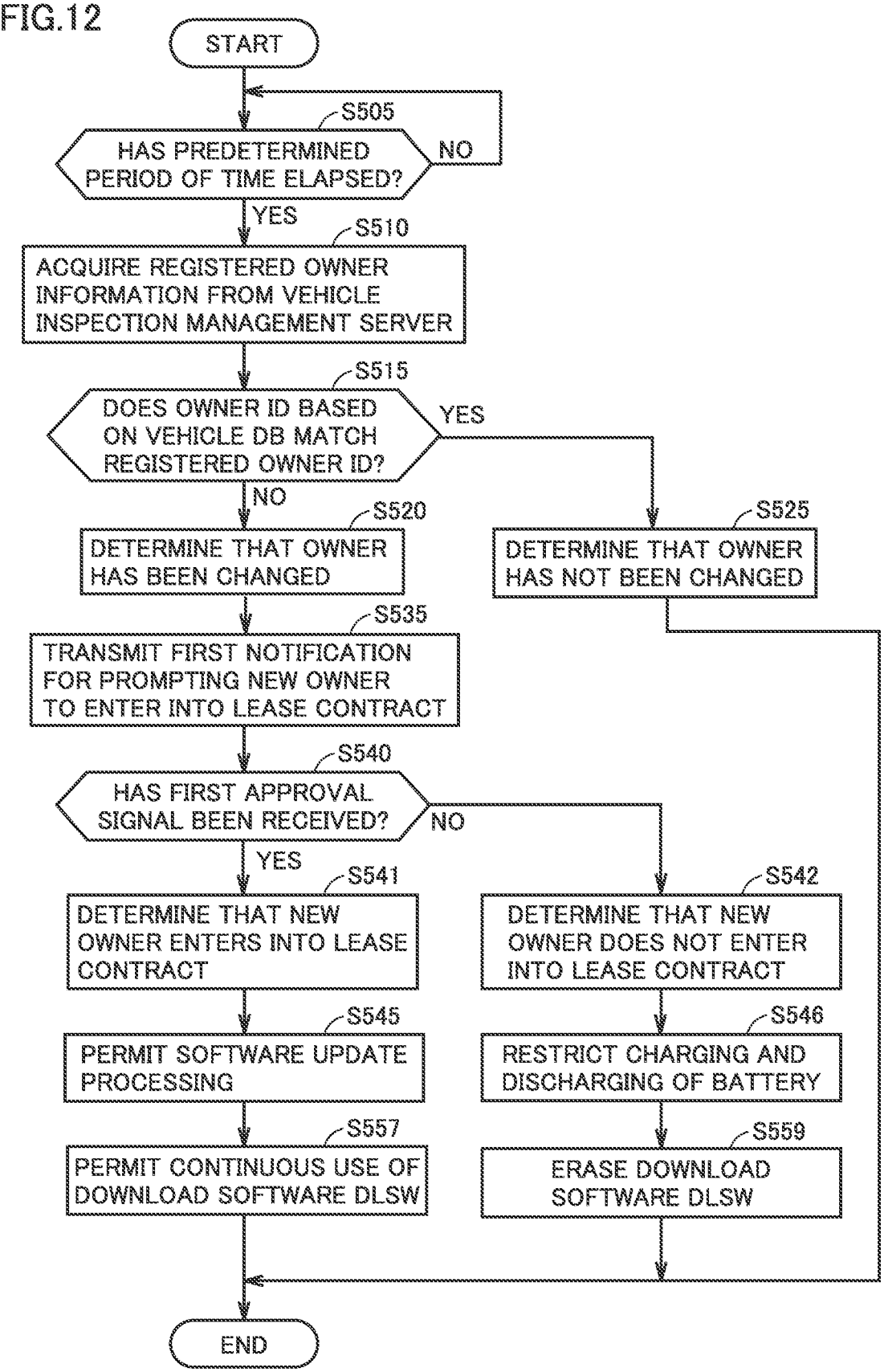

SERVER

CROSS REFERENCE TO RELATED APPLICATIONS

This nonprovisional application is based on Japanese Patent Application No. 2022-191184 filed on Nov. 30, 2022, with the Japan Patent Office, the entire contents of which are hereby incorporated by reference.

BACKGROUND OF THE DISCLOSURE

Field

The present disclosure relates to a server.

Description of the Background Art

Japanese Patent Laying-Open No. 2002-269407 discloses a used car sales system.

SUMMARY

An OTA (Over The Air) function using wireless communication between a vehicle and a server is attracting attention. According to the OTA function, the vehicle updates in-vehicle software by downloading new data from the server. Since the OTA function can eliminate the need for software maintenance by a dealer, it is possible to improve user convenience. A server for providing an OTA function to a vehicle is operated by an enterprise such as a vehicle manufacturer.

Since a power storage device to be installed in a vehicle has value in itself, it is sometimes distributed separately from the vehicle. In this case, an owner of the power storage device is, for example, the above enterprise, and is distinguished from an owner of the vehicle. An owner of a vehicle typically enters into a lease contract for a power storage device with an owner of the power storage device, and uses the power storage device. The owner of the power storage device manages the power storage device based on the lease contract. This owner may collect and reuse the power storage device after the lease contract has expired. Therefore, the lease contracts for power storage devices are preferable from the viewpoint of effective utilization of the power storage devices.

An owner of a vehicle may transfer a vehicle to another person (transferee) as a used vehicle while a power storage device is installed in the vehicle. If the vehicle is transferred without permission of the owner of the power storage device, the owner of the vehicle will be changed, but the owner of the power storage device may not be capable of identifying the transferee. As a result, the owner of the power storage device cannot enter into a lease contract with the transferee, and thus cannot manage the power storage device based on this lease contract. This is not preferable from the viewpoint of effective utilization of the power storage device.

The present disclosure has been made in view of the above-mentioned problems, and has an object to provide a server that enables improvement of user convenience and effective utilization of power storage devices to be installed in vehicles based on lease contracts for power storage devices.

A server of the present disclosure is configured to communicate with a vehicle. The vehicle includes a power storage device and a storage unit that stores software. The server includes a communication device and a processing device. The communication device is configured to perform wireless communication with the vehicle. The processing device is configured to be capable of executing update processing for updating the software via the wireless communication. A first owner as an owner of the vehicle has entered into a first lease contract for leasing the power storage device. The processing device permits the update processing when the owner has been changed from the first owner to a second owner and the second owner enters into a second lease contract for leasing the power storage device.

With the above configuration, the update processing is permitted when the second owner enters into a lease contract. This enables in-vehicle software to be updated via the wireless communication, so that convenience for the second owner can be improved. As a result, the second owner can be motivated to enter into a lease contract. Therefore, the power storage device can be effectively used based on the lease contract for the power storage device.

The communication device may be configured to communicate with a first management server that stores registered owner information indicating a registered owner who is registered as an owner of the vehicle when a vehicle inspection of the vehicle is performed. The processing device may acquire the registered owner information from the first management server through the communication device, and determine according to the registered owner information whether or not the owner has been changed.

If a vehicle is transferred without permission of an owner of a power storage device, the owner of the power storage device may not be capable to identifying the transferee (an owner of the vehicle after the transfer). On the other hand, even after the vehicle has been transferred to the transferee, it is considered that vehicle inspection of the vehicle will be carried out periodically. The above configuration enables the server to determine based on the registered owner information who the current registered owner of the vehicle is, so that it is possible to determine that the owner of the vehicle has been changed from the first owner to the second owner.

The communication device may be configured to communicate with a second management server. The second management server stores payment status information indicating a payment status of a lease fee for the power storage device. The lease fee is set by the first lease contract as a fee that the first owner is required to pay for leasing the power storage device. The processing device may acquire the payment status information from the second management server through the communication device, and acquire the registered owner information when the payment status information indicates non-payment of the lease fee over a predetermined threshold period of time.

If non-payment of the lease fee continues over a period longer than the threshold period, the first owner may have illegally transferred the vehicle to the second owner with the power storage device being installed in the vehicle. The above configuration allows the server to acquire payment status information when non-payment continues. As a result, the server can determine at an appropriate timing that the owner of the vehicle has been changed from the first owner to the second owner.

The processing device may acquire the registered owner information every predetermined period of time.

It is also considered to be preferable to periodically determine whether or not the owner of the vehicle has been changed. The above configuration causes the server to periodically acquire the registered owner information, so that it is possible to periodically determine whether or not the owner of the vehicle has been changed.

When determining that the owner has been changed to the second owner, the processing device may transmit a first notification for prompting the second owner to enter into the second lease contract to the vehicle through the communication device.

The above configuration makes it possible to motivate the second owner to enter into a second lease contract. As a result, the power storage devices can be effectively used by a leasing company of the power storage devices.

The processing device may determine that the second owner enters into the second lease contract when receiving, through the communication device, a first approval signal indicating that the second owner approves of entering into the second lease contract.

When determining that the second owner enters into the second lease contract, the processing device may transmit a second notification for prompting the second owner to enter into an insurance contract for the power storage device to the vehicle through the communication device.

The above configuration makes it possible to motivate the second owner to enter into the insurance contract in addition to the lease contract. As a result, it is possible to avoid a situation where the vehicle is not effectively utilized after the power storage device is damaged.

The processing device may permit the update processing when the second owner enters into an insurance contract.

With the above configuration, update processing is permitted when the second owner enters into the insurance contract in addition to the lease contract. This can motivate the second owner to enter into the insurance contract in addition to the lease contract.

The processing device may determine that the second owner enters into the insurance contract when receiving, through the communication device, a second approval signal indicating that the second owner approves of entering into the insurance contract.

A mode of the wireless communication may include a first communication mode and a second communication mode having a higher communication speed than the first communication mode. The processing device may permit the update processing in the second communication mode when the second owner enters into an insurance contract for the power storage device.

Since the second mode has a communication speed higher than that of the first mode, the update processing is completed in a shorter time in the second mode than that in the first mode. With the above configuration, when the second owner enters into the insurance contract in addition to the lease contract, update processing in the second mode is permitted, which enables the time required for update processing to be shortened. As a result, the second owner can be effectively motivated to enter into the insurance contract in addition to the lease contract.

The processing device may determine that the second owner enters into the insurance contract when receiving, through the communication device, a second approval signal indicating that the second owner approves of entering into the insurance contract.

The vehicle may be configured to communicatively connect with a network. The processing device may permit the second owner to use download software when permitting the update processing. The download software is software that is downloaded from the network to the storage unit while the vehicle is being used by the first owner.

With the above configuration, even after the owner has been changed from the first owner to the second owner, the download software can be continuously used and effectively utilized by the second owner. This can benefit the second owner. As a result, the second owner can be motivated to enter into a lease contract.

The foregoing and other objects, features, aspects and advantages of the present disclosure will become apparent from the following detailed description of the disclosure when taken in conjunction with the accompanying drawings.

BRIEF DESCRIPTION OF THE DRAWINGS

FIG. 8 is a diagram illustrating a data structure of an account information DB;

FIG. 11 is a flowchart illustrating processing to be executed by a server in a third modification; and FIG. 12 is a flowchart illustrating processing to be executed by the server in a fourth modification.

DESCRIPTION OF THE PREFERRED EMBODIMENTS

Embodiments of the present disclosure will be described in detail hereunder with reference to the drawings. The same or corresponding portions in the figures are designated by the same reference signs, and description thereof will not be repeated. The respective embodiments and modifications thereof may be combined with one another as appropriate.

Figure 1:
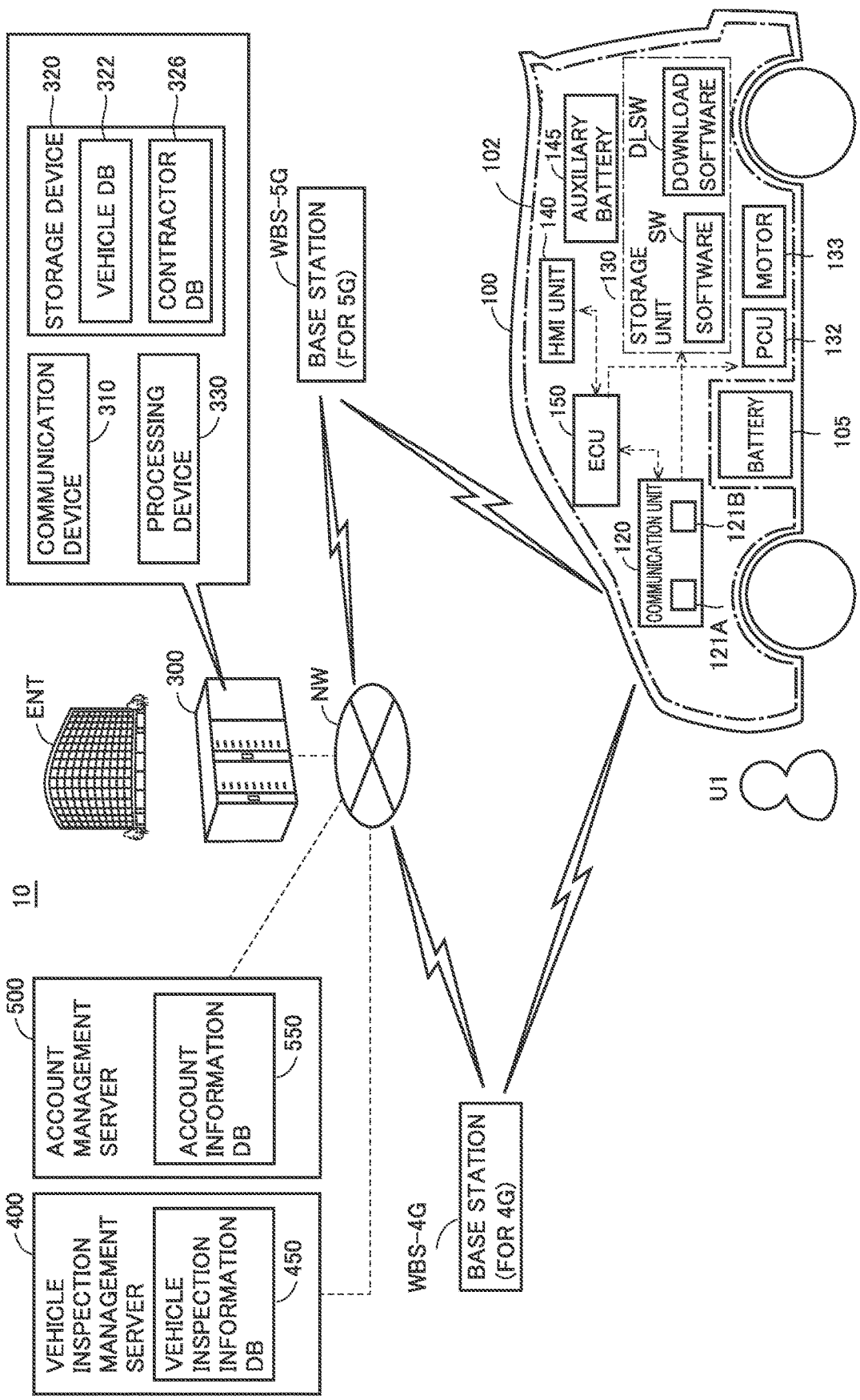
FIG. 1 is a diagram illustrating a configuration of an information processing system in an embodiment.

FIG. 1 is a diagram illustrating a configuration of an information processing system in an embodiment. Referring to FIG. 1, an information processing system 10 includes a vehicle 100, a server 300, a vehicle inspection management server 400, and an account management server (bank server) 500.

Vehicle 100 is an electrically powered vehicle, and includes a base vehicle 102 and a battery 105. Base vehicle 102 is the remainder of vehicle 100 other than battery 105, and is owned by user U1.

Battery 105 stores electric power required traveling of vehicle 100. Battery 105 is an example of a "power storage device" of the present disclosure. The owner of battery 105 is an enterprise ENT, and is distinguished from the owner of base vehicle 102 (user U1). Enterprise ENT is a manufacturer of vehicle 100, and also a leasing company of battery 105.

User U1 has entered into a lease contract with enterprise ENT to lease battery 105 from enterprise ENT. In addition, user U1 has entered into an insurance contract for battery 105 with enterprise ENT. This insurance contract is, for example, a contract for reducing a repair cost required to repair a damage when battery 105 suffers the damage while user U1 is using vehicle 100.

If no insurance contract has been made, user U1 may pay a large amount of repair cost when battery 105 is damaged. As a result, user U1 may lose motivation to use vehicle 100 (base vehicle 102) again. This is not preferable from the viewpoint of effective utilization of base vehicle 102. On the other hand, according to the insurance contract, when battery 105 is damaged, user U1 only has to pay a reduced repair cost. Therefore, it is possible to avoid a situation in which the owner of vehicle 100 (vehicle owner) loses motivation to use vehicle 100 due to damage to battery 105. As a result, it is possible to avoid a situation in which vehicle 100 is not effectively utilized after battery 105 is damaged.

Base vehicle 102 includes a communication unit 120, a storage unit 130, a PCU (Power Control Unit) 132, a motor 133, an HMI (Human Machine Interface) unit 140, an auxiliary battery 145, and an ECU (Electronic Control Unit) 150.

Communication unit 120 includes communication modules 121-A and 121-B. Communication modules 121-A and 121-B wirelessly communicate with server 300 by communicatively connecting to network NW through wireless base stations WBS-4G and WBS-5G, respectively. Communication modules 121-A and 121-B download update data for in-vehicle software (software SW described later) from server 300 to vehicle 100 through wireless base stations WBS-4G and WBS-5G respectively, whereby the in-vehicle software (OTA function) is updated.

Radio base stations WBS-4G and WBS-5G are used for a 4th generation mobile communication system (4G) and a 5th generation mobile communication system (5G), respectively. Modes of wireless communication between vehicle 100 and server 300 include a 4G communication mode and a 5G communication mode. In the 4G communication mode, communication module 121-A communicates with server 300 through wireless base station WBS-4G. In the 5G communication mode, communication module 121-B communicates with server 300 through wireless base station WBS-5G. The 5G communication mode has a communication speed faster than that of the 4G communication mode. In this embodiment, vehicle 100 performs the OTA function in the 4G communication mode. The 4G communication mode and the 5G communication mode are examples of "first communication mode" and "second communication mode" of the present disclosure, respectively.

Storage unit 130 stores software SW and download software DLSW. Software SW is in-vehicle software, and includes an operating system (OS) to be installed in vehicle 100 and various application software. The application software is installed by default when user U1 purchases vehicle 100. Download software DLSW is software (including various application software) downloaded from network NW to storage unit 130 while vehicle 100 is being used by user U1.

PCU 132 includes a converter and an inverter (both not shown). PCU 132 receives discharge power from battery 105, converts this discharge power into AC power, and supplies the converted power to motor 133, whereby motor 133 rotates and vehicle 100 travels.

HMI unit 140 is a touch screen, and receives an input of user operation and displays various screens. HMI unit 140 is operated, for example, when download software DLSW is used. Accessory battery 145 stores electric power for driving auxiliaries such as HMI unit 140.

ECU 150 controls various devices of vehicle 100 such as communication unit 120, PCU 132, motor 133, and HMI unit 140. ECU 150 controls charging and discharging of battery 105 through control of PCU 132 (for example, starting and stopping).

Server 300 is operated by enterprise ENT, and includes a communication device 310, a storage device 320, and a processing device 330. Communication device 310 is communicatively connected to network NW to perform wireless communication with an external device (for example, vehicle 100) of server 300. Communication device 310 is configured to communicate with each of vehicle inspection management server 400 and account management server 500 via network NW.

Storage device 320 stores a vehicle DB 322. The data structure of vehicle DB 322 will be described in detail later.

Processing device 330 provides vehicle 100 with an OTA function. Specifically, processing device 330 is configured to be capable of executing software update processing for updating software SW via wireless communication between server 300 and vehicle 100. The software update processing is executed (regularly) each time a predetermined update timing has come, as long as the above processing is permitted. In the embodiment, processing device 330 executes software update processing in the 4G mode. Specifically, server 300 transmits update data for updating software SW to vehicle 100 via network NW and wireless base station WBS-4G.

Vehicle inspection management server 400 is operated by an organization for managing vehicle inspections (for example, a government agency or a used car dealer), and stores a vehicle inspection information DB 450. A vehicle inspection is performed on each of a plurality of vehicles including vehicle 100.

Account management server 500 is operated by a bank, and stores an account information DB 550. Account information DB 550 includes bank account information of each of a plurality of users who use the plurality of vehicles.

Each of vehicle inspection information DB 450 and account information DB 550 is accessed by server 300 via network NW. The data structure of each of vehicle inspection information DB 450 and account information DB 550 will be described in detail later.

Figures 2, 3, 4:
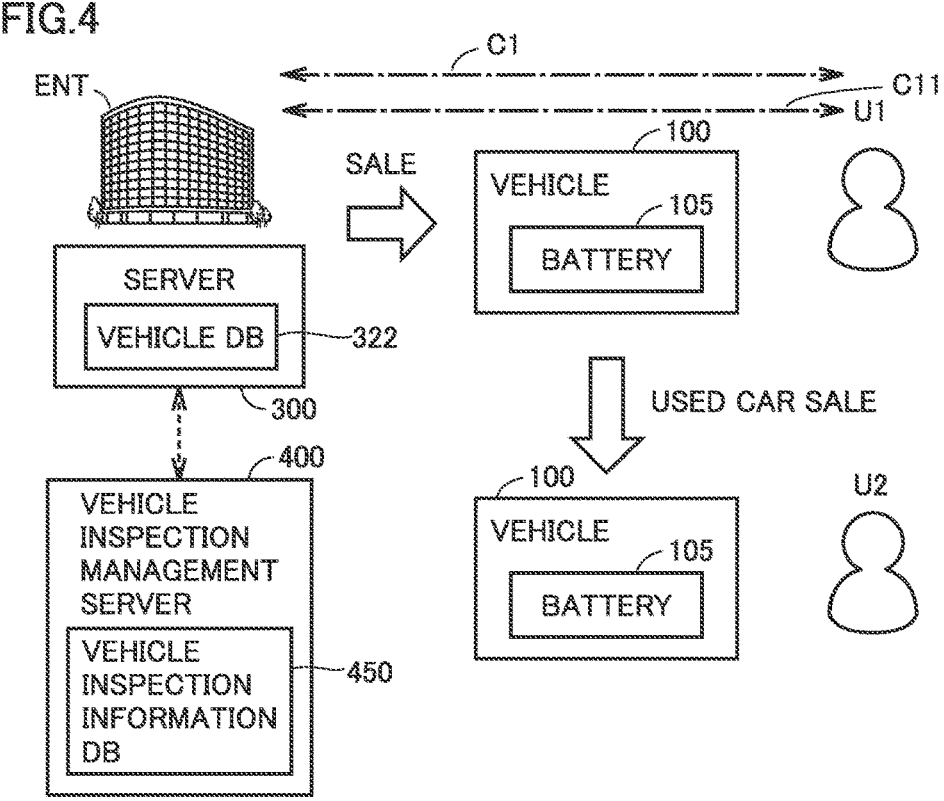
FIG. 2 is a diagram illustrating a data structure of a vehicle DB (Database)
FIG. 3 is a diagram illustrating a data structure of a vehicle inspection information DB.
FIG. 4 is a diagram showing a problem caused in a case where a vehicle is transferred as a used car from a user U1 to another person.

FIG. 2 is a diagram illustrating a data structure of vehicle DB 322. Referring to FIG. 2, each of a plurality of vehicles including vehicle 100 is assigned a vehicle ID. Vehicle DB 322 indicates a user ID and a vehicle communication address for each vehicle ID. This user ID indicates identification information of a vehicle user, and corresponds to the owner ID of the corresponding vehicle. The communication address is the address of the communication device of the corresponding vehicle (communication unit 120 in the example of vehicle 100). In this example, it is assumed that the vehicle having vehicle ID of 001 is vehicle 100, and the user having the user ID of 00A is user U1.

FIG. 3 is a diagram illustrating the data structure of vehicle inspection information DB 450. Referring to FIG. 3, vehicle inspection information DB 450 includes registered owner information 460. Registered owner information 460 includes registered owners ID. The registered owner is a person who is registered as the owner of a vehicle (vehicle 100 in this example) when the vehicle is inspected. In this example, it is assumed that the user having the registered owner ID of 00D is a user U2 (described later).

FIG. 4 is a diagram illustrating a problem caused in a case where vehicle 100 is transferred as a used car from user U1 to another person.

Referring to FIG. 4, user U1 enters into a lease contract C1 (and an insurance contract C11) with enterprise ENT and uses battery 105. Lease contract C1 and insurance contract C11 are respectively a lease contract and an insurance contract for battery 105 which are made between user U2 and enterprise ENT. Enterprise ENT manages battery 105 based on lease contract C1. Enterprise ENT can collect and reuse battery 105 after expiration of lease contract C1. Therefore, the lease contract for battery 105 such as lease contract C1 is preferable from the viewpoint of effective utilization of battery 105.

User U1 may transfer vehicle 100 (base vehicle 102 and battery 105) to user U2 as a used vehicle without permission of enterprise ENT. If vehicle 100 is transferred from user U1 to user U2, battery 105 is also transferred without permission of enterprise ENT, and the vehicle owner is changed from user U1 to user U2. On the other hand, enterprise ENT (the owner of battery 105) may not be able to grasp that battery 105 has been transferred without permission and user U2 become a new vehicle owner (an occupier of battery 105). Specifically, when the vehicle owner indicated by vehicle DB 322 is still user U1, server 300 may not be able to determine that the vehicle owner has changed. As a result, server 300 cannot determine the changed vehicle owner (user U2). Therefore, enterprise ENT cannot enter into a lease contract with user U2, and cannot manage battery 105 based on this lease contract. This is not preferable from the viewpoint of effective utilization of battery 105.

Server 300 according to the embodiment has a feature for dealing with the above problem. This point will be described in detail below.

Figure 5:
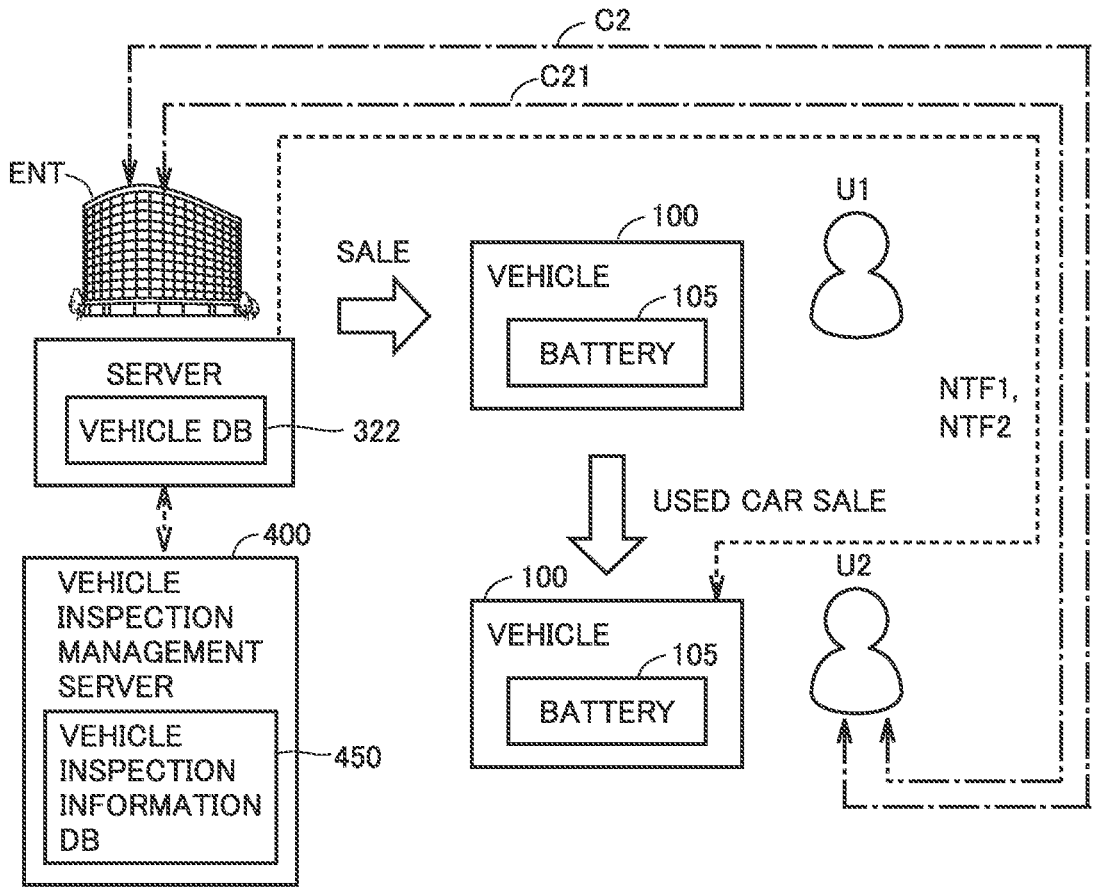
FIG. 5 is a diagram showing features of a server.

FIG. 5 is a diagram showing features of server 300. Referring to FIG. 5, server 300 (processing device 330) permits the software update processing described above when the vehicle owner has been changed from user U1 to user U2 and user U2 enters into a lease contract C2 with enterprise ENT. Lease contract C2 is a contract for allowing user U2 to lease battery 105 from enterprise ENT.

When the software update processing is permitted as described above, the OTA function of vehicle 100 continues even after the vehicle owner has been changed from user U1 to user U2. As a result, software SW can be updated by wireless communication between vehicle 100 and server 300 within a usage period of vehicle 100 by user U2. Therefore, software maintenance by a dealer can be eliminated, and convenience for user U2 can be improved. Accordingly, it is possible to motivate user U2 to enter into lease contract C2. Therefore, when lease contract C2 is made, battery 105 can be effectively used based on lease contract C2.

How server 300 determines the change of the vehicle owner will be described hereunder. Server 300 first acquires registered owner information 460 (registered owner ID) for vehicle 100 from vehicle inspection management server 400 (vehicle inspection information DB 450) through communication device 310. Then, server 300 determines according to registered owner information 460 whether or not the vehicle owner has changed from user U1. Specifically, server 300 identifies user ID (00A) related to vehicle ID (001) of vehicle 100 according to vehicle DB 322, and determines whether or not this user ID matches registered owner ID for vehicle 100. When user ID matches registered owner ID, server 300 determines that the vehicle owner is still user U1, and has not been changed. On the other hand, when these IDs are different from each other, server 300 determines that the vehicle owner has changed from user U1 to user U2 (a user identified by registered owner ID of vehicle inspection information DB 450).

Even after vehicle 100 is transferred to user U2, it is considered that a vehicle inspection of vehicle 100 is executed periodically and user U2 is identified as a registered owner at the time of the vehicle inspection. As described above, server 300 determines based on registered owner information 460 whether or not the vehicle owner has been changed. As a result, server 300 can appropriately determine (identify) the new vehicle owner (user U2).

It is preferable that server 300 acquires registered owner information 460 for vehicle 100 every predetermined period of time. Information representing the predetermined period of time is stored in storage device 320. The predetermined period of time is, for example, j days, k weeks, m months, or n years, and each of j, k, m, and n represents a natural number of 1 or more.

It is also considered that it is preferable to periodically determine whether or not the vehicle owner has changed. By acquiring registered owner information 460 every predetermined period of time as described above, server 300 can periodically determine whether or not the vehicle owner has changed.

When determining that the vehicle owner has changed from user U1 to user U2, server 300 transmits a first notification NTF1 for prompting user U2 to enter into lease contract C2 to vehicle 100. First notification NTF1 is transmitted based on the address of communication unit 120 included in vehicle DB 322.

Server 300 may transmit, to vehicle 100, a second notification NTF2 for prompting user U2 to enter into an insurance contract C21. Insurance contract C21 is an insurance contract for battery 105 which is made between user U2 and enterprise ENT. Second notification NTF2 is transmitted based on the address of communication unit 120 which is included in vehicle DB 322. When battery 105 is damaged while user U2 is using vehicle 100, insurance contract C21 reduces a repair cost required to repair the damage. A case where a second notification NTF2 is transmitted, it will be described in a second modification.

Figure 6:
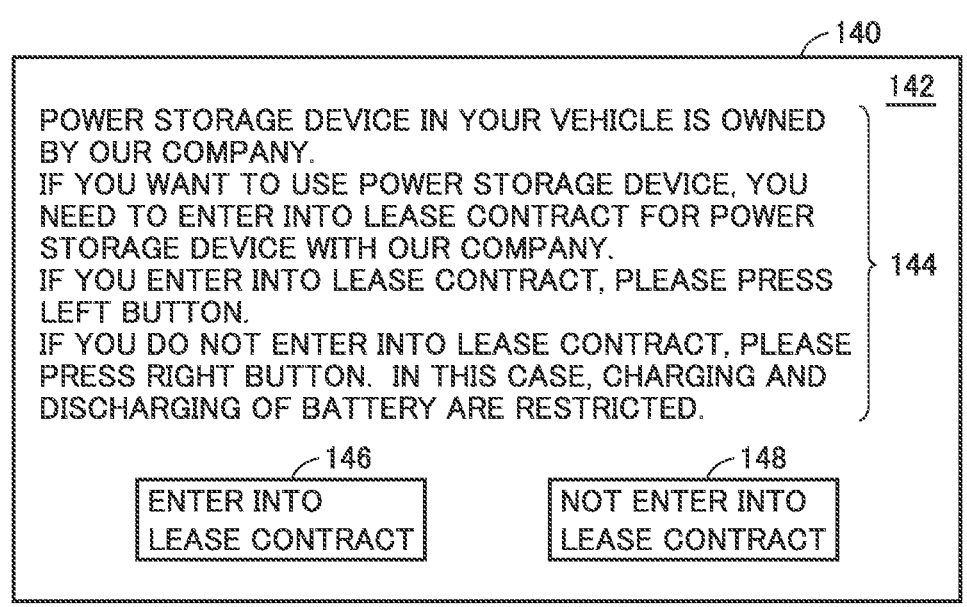
FIG. 6 is a diagram illustrating a screen displayed on an HMI unit.

FIG. 6 is a diagram illustrating a screen displayed on HMI unit 140. This screen is displayed when vehicle 100 (communication unit 120) has received first notification NTF1.

Referring to FIG. 6, a screen 142 includes a message 144 and buttons 146 and 148. Message 144 informs user U2 that battery 105 has been owned by enterprise ENT. Message 144 prompts user U2 to enter into lease contract C2 with enterprise ENT.

Button 146 is operated when user U2 enters into lease contract C2. In response to the operation of button 146, communication unit 120 transmits a first approval signal to server 300. The first approval signal indicates that user U2 approves of entering into lease contract C2.

Button 148 is operated when user U2 does not enter into lease contract C2. In response to the operation of button 148, communication unit 120 transmits a first disapproval signal to server 300. The first disapproval signal indicates that user U2 does not enter into lease contract C2. When the first disapproval signal is transmitted to server 300, server 300 executes charging and discharging restriction processing for restricting charging and discharging of battery 105.

The charge and discharge restriction processing corresponds to processing of transmitting, to vehicle 100, a command for restricting (in this example, stopping) control of PCU 132 by ECU 150. When this command is transmitted to vehicle 100, the control of PCU 132 by ECU 150 is stopped. As a result, charging and discharging of battery 105 is prohibited. This makes it possible to avoid a situation where vehicle 100 travels with the electric power of battery 105 even though user U2 has not entered into lease contract C2 (user U2 illegally drives vehicle 100).

In this way, screen 142 is displayed in response to first notification NTF1. This can motivate user U2 to enter into lease contract C2. As a result, battery 105 can be effectively used by enterprise ENT based on lease contract C2.

Figure 7:
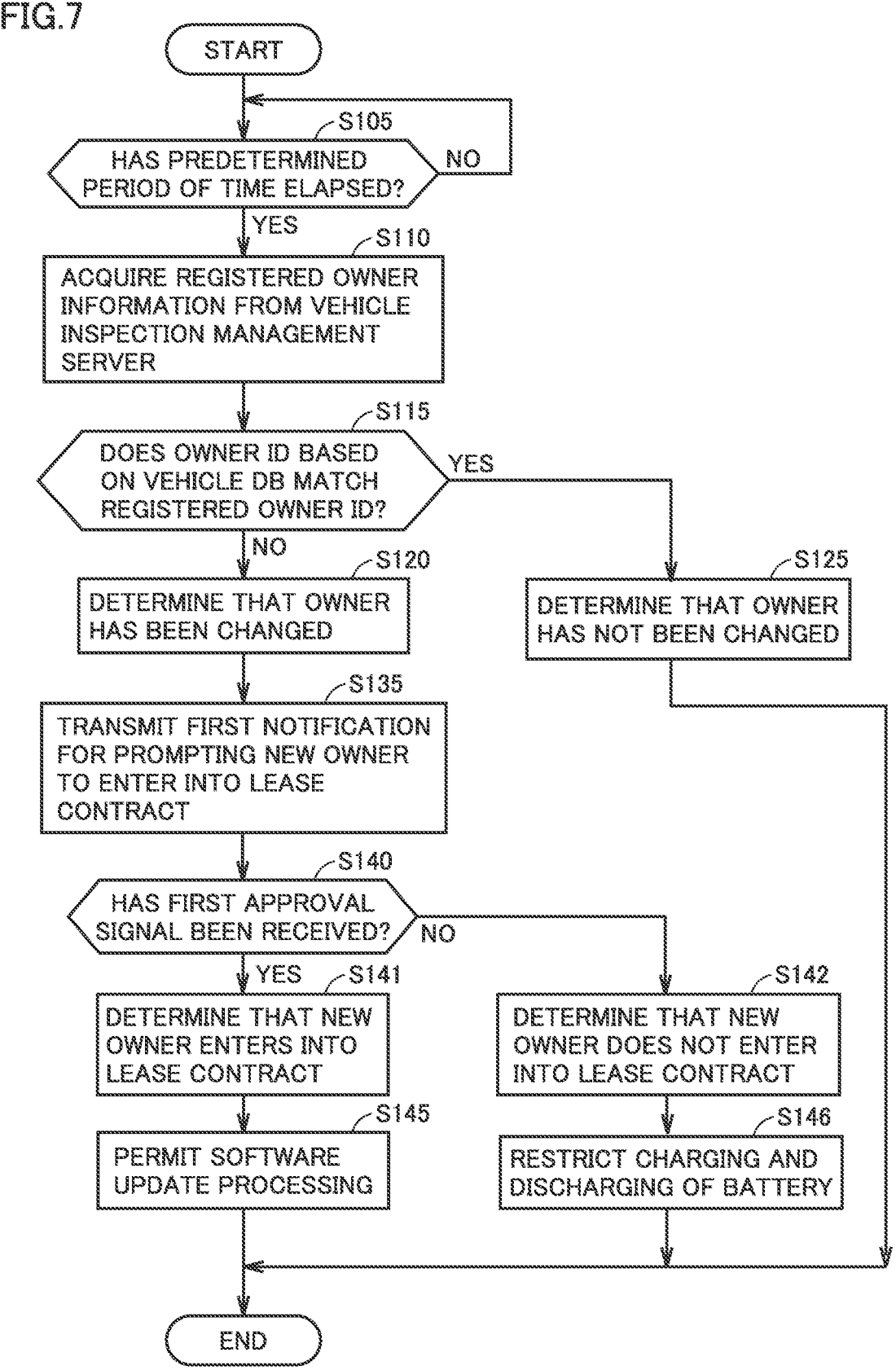
FIG. 7 is a flowchart illustrating processing to be executed by the server in the embodiment.

FIG. 7 is a flowchart illustrating the processing to be executed by server 300 in the embodiment. Hereinafter, the step is abbreviated as "S".

Referring to FIG. 7, server 300 determines whether or not the aforementioned predetermined period of time has elapsed since registered owner information 460 was previously acquired (S105). If the predetermined period of time has not yet elapsed (NO in S105), S105 is repeated until the predetermined period of time has elapsed. If the predetermined period of time has elapsed (YES in S105), the processing proceeds to S110.

Server 300 acquires registered owner information 460 from vehicle inspection management server 400 (vehicle inspection information DB 450) (S110). Server 300 determines whether or not the owner ID (ID of user U1) for vehicle 100 based on vehicle DB 322 matches the registered owner ID of registered owner information 460 (S115). If the owner ID matches the registered owner ID (YES in S115), server 300 determines that the vehicle owner has not been changed from user U1 (S125), and ends the processing. If the owner ID does not match the registered owner ID, that is, if the owner ID is different from the registered owner ID (NO in S115), server 300 determines that the vehicle owner has been changed from user U1 (S120). Then, server 300 determines (identifies) a new owner (user U2) based on the registered owner ID. Then, the processing proceeds to S135.

Server 300 transmits first notification NTF1 for prompting user U2 to enter into the lease contract C2 (S135) to vehicle 100 through communication device 310. Thereafter, the processing proceeds to S140.

Server 300 determines whether or not it has received the above-mentioned first approval signal from vehicle 100 within a predetermined first approval period of time (S140). Information representing the first approval period of time is stored in storage device 320. The first approval period of time is a period of time after first notification NTF1 (S135), and it is, for example, a period of time within i1 days from the time of transmission of first notification NTF1 (i1 represents a natural number).

If server 300 has received the first approval signal within the first approval period (YES in S140), server 300 determines that user U2 enters into lease contract C2 (S141). Next, server 300 permits the software update processing (S145), and ends the processing. Thereafter, server 300 executes the software update processing every time the above-mentioned update timing has come.

If server 300 has not received the first approval signal within the first approval period, for example, if it has received the first disapproval signal (NO in S140), server 300 determines that user U2 does not enter into lease contract C2 (S142). Next, server 300 executes processing for restricting charging and discharging of battery 105 (S146), and ends the processing. In this case, the software update processing is not permitted, and vehicle 100 does not perform the OTA function during the usage period of vehicle 100 by user U2.

According to the embodiment, it is possible to effectively utilize battery 105 based on lease contract C2 while improving convenience for user U2.

[First Modification]

Server 300 may acquire registered owner information 460 when a situation where the lease fee of battery 105 has not been paid continues over a predetermined threshold period of time. This lease fee is set by lease contract C1 as a fee which user U1 must pay to lease battery 105. Information representing the threshold period of time is stored in storage device 320. The threshold period of time is, for example, e days, f weeks, g months, or h years, and each of e, f, g, and h represents a natural number of 1 or more.

FIG. 8 is a diagram illustrating a data structure of account information DB 550. As mentioned above, account information DB 550 is stored in account management server 500.

Referring to FIG. 8, account information DB 550 includes payment status information 554. Payment status information 554 indicates the payment status of the lease fee by user U1 (specifically, whether the lease fee has already been debited or not) for every month. In this example, a threshold period of time is assumed to be three months. Payment status information 554 indicates non-payment of the lease fee by user U1 over the threshold period of time (three months from February to April).

Server 300 acquires payment status information 554 from account management server 500 (account information DB 550) through communication device 310. In this example, server 300 determines that payment status information 554 indicates non-payment of the lease fee over the threshold period of time. Server 300 acquires registered owner information 460 based on this determination result.

When non-payment of the lease fee continues over a period of time longer than the threshold period of time, user U1 may have already disappeared after illegally transferring vehicle 100 (base vehicle 102 and battery 105) to user U2. In this first modification, non-payment of the lease fee by user U1 acts as a trigger for causing server 300 to acquire registered owner information 460. As a result, server 300 can determine the new vehicle owner (user U2) based on registered owner information 460. Therefore, server 300 can determine, at an appropriate timing, that the vehicle owner has changed from user U1 to user U2.

Figure 9:
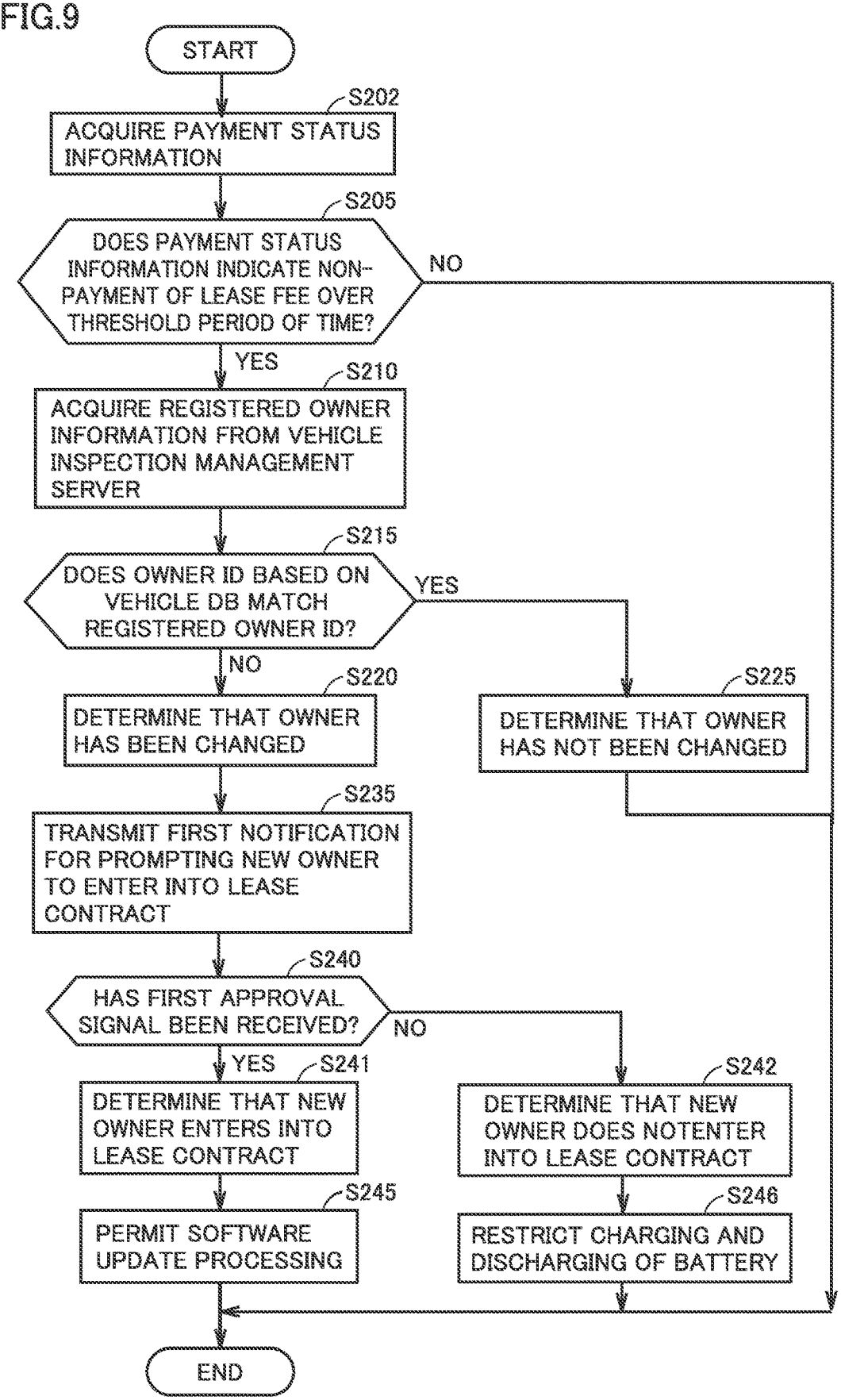
FIG. 9 is a flowchart illustrating processing to be executed by a server in a first modification.

FIG. 9 is a flowchart illustrating processing to be executed by server 300 in the first modification. Referring to FIG. 9, this flowchart differs from the flowchart of the embodiment described above (FIG. 7) in that S202 is added and S205 is executed instead of S105. S210 to S246 are similar to S110 to S146, respectively. This flowchart is executed, for example, every predetermined period of time described above.

Server 300 acquires payment status information 554 from account management server 500 (account information DB 550) through communication device 310 (S202). Server 300 determines whether or not payment status information 554 indicates non-payment of the lease fee over the threshold period of time (S205). If payment status information 554 indicates non-payment of the lease fee over the threshold period of time (YES in S205), the processing proceeds to S210. If not (NO in S205), the processing ends.

According to the first modification, server 300 can determine, at an appropriate timing, that the vehicle owner has changed from user U1 to user U2. As a result, the number of times at which server 300 accesses vehicle inspection management server 400 to acquire registered owner information 460 can be reduced to the necessity minimum.

[Second Modification]

Server 300 may permit the software update processing when user U2 enters into insurance contract C21 in addition to lease contract C2. Specifically, server 300 (processing device 330) permits the software update processing when receiving a second approval signal indicating that user U2 approves of entering into insurance contract C21 from vehicle 100 through the communication device 310.

With the above configuration, when user U2 enters into insurance contract C21 in addition to lease contract C2, the software update processing is permitted (the OTA function continues). This can motivate user U2 to enter into insurance contract C21 in addition to lease contract C2. As a result, in the event where battery 105 is damaged, user U2 only has to pay a reduced repair cost. Therefore, it is possible to avoid a situation where user U2 loses motivation for using vehicle 100 due to damage to battery 105. Therefore, it is possible to avoid a situation where base vehicle 102 is not effectively utilized after failure of battery 105.

User U2 can use HMI unit 140 to decide whether or not to approve insurance contract C21. Specifically, in response to reception of second notification NTF2 (FIG. 5), HMI unit 140 displays an inquiry screen (not shown) for inquiring of user U2 whether or not to approve insurance contract C21, and user U2 decides whether or not to approve insurance contract C21 by operating this screen. When user U2 performs an operation of approving insurance contract C21, communication unit 120 transmits the second approval signal described above to server 300. When user U2 does not perform an operation of approving insurance contract C21, communication unit 120 transmits a second disapproval signal to server 300. The second disapproval signal indicates that user U2 does not enter into insurance contract C21.

Figure 10:
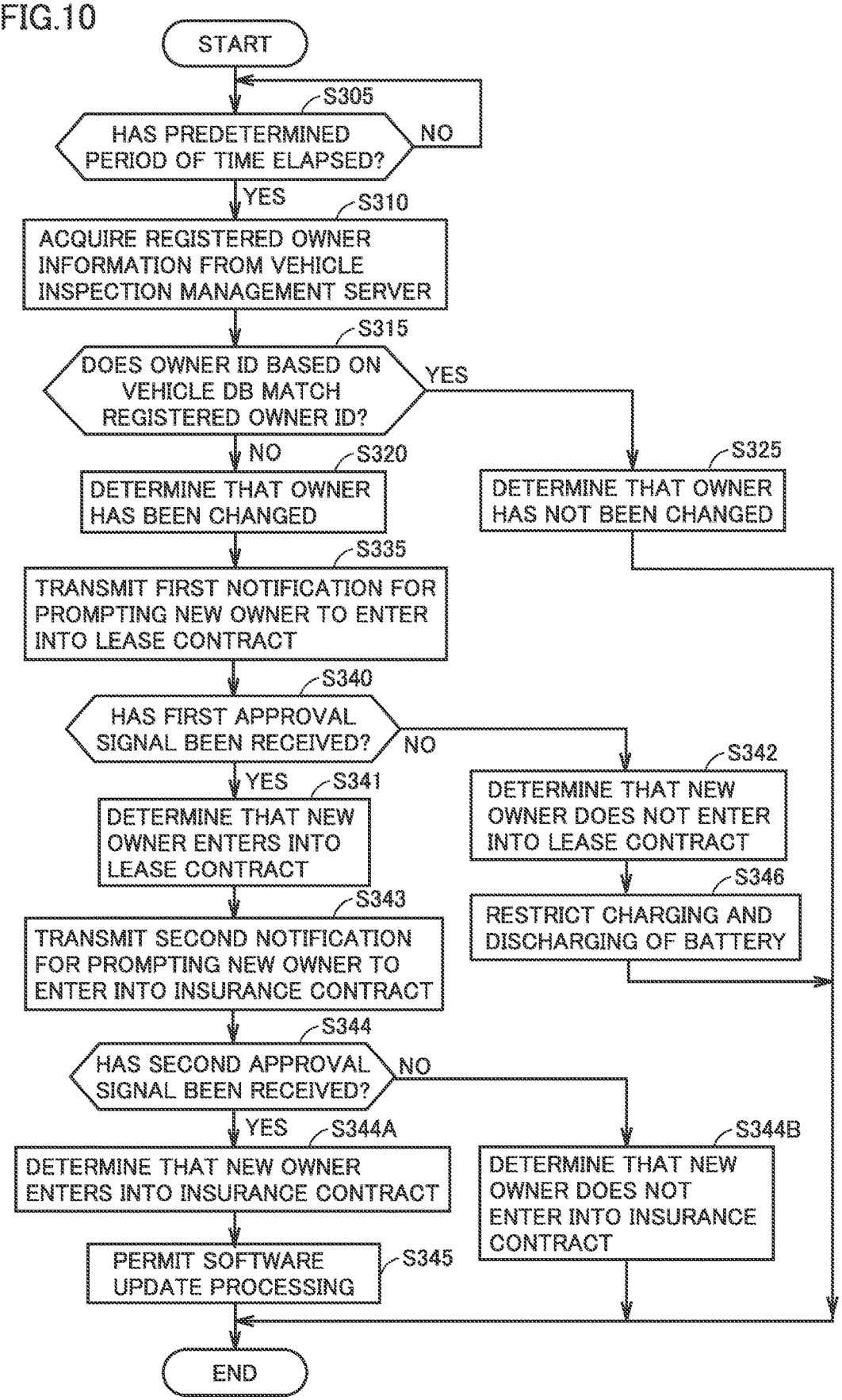
FIG. 10 is a flowchart illustrating processing to be executed by a server in a second modification.

FIG. 10 is a flowchart illustrating processing to be executed by server 300 in this second modification. Referring to FIG. 10, in the point that S343, S344, S344A, and S344B are added, this flow chart is different from the flowchart of the embodiment described above (FIG. 7). S305 to S342, S345, and S346 are the same as S105 to S142, S145, and S146, respectively.

After S341, server 300 transmits second notification NTF2 for prompting user U2 to enter into insurance contract C21 to vehicle 100 through communication device 310 (S343). Thereafter, the processing proceeds to S344.

Server 300 determines whether or not it has received the second approval signal described above from vehicle 100 through communication device 310 within the second approval period (S344). Information representing the second approval period is stored in storage device 320. The second approval period is a period after second notification NTF2 (S343), and it is, for example, a period within i2 days from the transmission time of second notification NTF2 (i2 represents a natural number). If server 300 has received the second approval signal within the second approval period (YES in S344), server 300 determines that user U2 enters into insurance contract C21 (S344A). The processing then proceeds to S345. If server 300 has not received the second approval signal within the second approval period, for example, if it has received the second disapproval signal (NO in S344), server 300 determines that user U2 does not enter into insurance contract C21 (S344A), and ends the processing.

According to the second modification, it is possible to avoid a situation where vehicle 100 (base vehicle 102) is not effectively used after failure of battery 105.

[Third Modification]

In this third modification, when acquiring the second approval signal through communication device 310 (that is, when user U2 enters into insurance contract C21), server 300 permits software update processing in a 5G communication mode. After this processing is permitted, server 300 executes the software update processing in the 5G mode every time an update timing has come. Specifically, server 300 transmits update data for updating software SW to vehicle 100 via network NW and wireless base station WBS-5G (FIG. 1).

Since the 5G mode has a higher communication speed than the 4G mode, the software update processing is completed in a shorter time in the 5G mode than that in the 4G mode. According to this third modification, when user U2 enters into insurance contract C21 in addition to lease contract C2, the software update processing in the 5G mode is permitted. Therefore, the time required for the software update processing (OTA function) can be shortened. As a result, it is possible to effectively motivate user U2 to enter into insurance contract C21 in addition to lease contract C2. Therefore, it is possible to avoid a situation where the owner of vehicle 100 (vehicle owner) loses motivation for using vehicle 100 due to damage to battery 105. Accordingly, it is possible to avoid a situation where base vehicle 102 is not effectively utilized after battery 105 is damaged.

FIG. 11 is a flowchart illustrating processing to be executed by server 300 in this third modification. Referring to FIG. 11, this flowchart differs from the flowchart of the aforementioned second modification (FIG. 10) in that S445 is executed instead of S345, and S447 is added. S405 to S444, S444A, S444B, and S446 are the same as S305 to S344, S344A, S344B, and S346, respectively.

When user U2 enters into insurance contract C21 (after S444A), server 300 permits the software update processing in the 5G mode (S445). If user U2 does not enter into insurance contract C21 (after S444B), server 300 permits the software update processing in the 4G mode (S447). After S445 and S447, the processing ends.

According to this third modification, similarly to the second modification, it is possible to avoid a situation where vehicle 100 (base vehicle 102) is not effectively used after battery 105 is damaged.

[Fourth Modification]

Server 300 (processing device 330) may permit user U2 to use download software DLSW when user U2 enters into lease contract C2, that is, when the software update processing is permitted. As described above, download software DLSW is software that has been downloaded to storage unit 130 during the usage period of vehicle 100 by user U1.

With this configuration, even after the vehicle owner has been changed from user U1 to user U2, download software DLSW can be continuously used (preferably free of charge) and effectively utilized by user U2. This can benefit user U2. As a result, user U2 can be motivated to enter into lease contract C2.

Note that when user U2 does not enter into lease contract C2, server 300 erases download software DLSW from storage unit 130 via wireless communication.

FIG. 12 is a flowchart illustrating processing to be executed by server 300 in this fourth modification. Referring to FIG. 12, this flowchart differs from the flowchart of the embodiment (FIG. 7) in that S557 and S559 are added. S505 to S546 are similar to S105 to S146, respectively.

If user U2 does not enter into lease contract C2 (after S542), server 300 erases download software DLSW from storage unit 130 via wireless communication after charging and discharging of battery 105 is restricted (after S546) (S559). When user U2 enters into lease contract C2 (after S541), after the software update processing is permitted (after S545), server 300 permits user U2 to continuously use download software DLSW (S557). Specifically, server 300 does not erase download software DLSW in storage unit 130, but starts download software DLSW when download software DLSW is instructed to start through HMI unit 140 by user U2. After S557 and S559, the processing ends.

According to this fourth modification, it is possible to motivate user U2 to enter into lease contract C2. Therefore, effective use of battery 105 can be more easily achieved.

OTHER VARIATIONS

Server 300 may determine that the vehicle owner has been changed when receiving, from vehicle 100, an owner change notification indicating that the vehicle owner has been changed from user U1 to user U2.

When server 300 determines that the vehicle owner has been changed, server 300 may restrict charging and discharging of battery 105 before receiving the first approval signal (for example, S146 may be executed after S120 in FIG. 7 and before YES in S140). With the above processing, charging and discharging of battery 105 is immediately restricted after it is determined that the vehicle owner has changed. As a result, it is possible to prevent user U2 from illegally using battery 105 (illegally driving vehicle 100) without entering into lease contract C2 before receiving the first approval signal. Note that even when charging and discharging of battery 105 is immediately restricted before receiving the first approval signal as described above, HMI unit 140 displays screen 142 using the electric power of auxiliary battery 145.

In the foregoing, the 4G communication mode and the 5G communication mode are used as examples of "first communication mode" and "second communication mode" of the present disclosure, respectively. However, the first communication mode is not limited to the 4G mode, and the second communication mode is not limited to the 5G mode as long as the wireless communication between server 300 and vehicle 100 includes a plurality of communication modes, and the second communication mode among the plurality of communication modes has a higher communication speed than the first communication mode.

Although the embodiments of the present disclosure have been described, the embodiments disclosed at this time should be considered to be illustrative in all respects and not restrictive. The scope of the present disclosure is indicated by the claims, and it is intended that all changes within the meaning equivalent to the claims and the range thereof are included.

What is claimed is:

1. A server that communicates with a vehicle including a power storage device and a storage unit that stores software, the server comprising:
    a communication device configured to (i) perform, via one or more base stations in a cellular network, wireless communication with the vehicle, (ii) communicate with a first management server that stores registered owner information indicating a registered owner who is registered as an owner of the vehicle when a vehicle inspection of the vehicle is performed, and (iii) communicate with a second management server that stores payment status information indicating a payment status of a lease fee; and
    a processing device configured to execute update processing for updating the software via the one or more base stations in the cellular network, wherein
    a first owner as an owner of the vehicle has entered into a first lease contract for leasing the power storage device,
    the lease fee is set by the first lease contract as a fee that the first owner is required to pay for leasing the power storage device, and
    the processing device is further configured to:
        acquire the payment status information from the second management server through the communication device,
        acquire the registered owner information from the first management server through the communication device based on determining the payment status information indicates non-payment of the lease fee over a predetermined threshold period of time,
        determine, according to the registered owner information, whether the owner has been change, and
        permit the update processing based on determining the owner has been changed from the first owner to a second owner and the second owner enters into a second lease contract for leasing the power storage device.

2. The server according to claim 1, wherein the processing device is further configured to acquire the registered owner information every predetermined period of time.

3. The server according to claim 1, wherein based on determining that the owner has been changed to the second owner, the processing device is further configured to transmit a first notification for prompting the second owner to enter into the second lease contract to the vehicle through the communication device.

4. The server according to claim 1, wherein the processing device is further configured to determine that the second owner enters into the second lease contract based on receiving, through the communication device, a first approval signal indicating that the second owner approves of entering into the second lease contract.

5. The server according to claim 1, wherein based on determining that the second owner enters into the second lease contract, the processing device transmits a second notification for prompting the second owner to enter into an insurance contract for the power storage device to the vehicle through the communication device.

6. The server according to claim 5, wherein the processing device determines that the second owner enters into the insurance contract based on receiving, through the communication device, a second approval signal indicating that the second owner approves of entering into the insurance contract.

7. The server according to claim 1, wherein the processing device permits the update processing based on determining the second owner enters into an insurance contract for the power storage device.

8. The server according to claim 1, wherein
    a mode of the wireless communication includes a first communication mode and a second communication mode having a higher communication speed than the first communication mode, and
    the processing device is further configured to permit the update processing in the second communication mode based on determining the second owner enters into an insurance contract for the power storage device.

9. The server according to claim 8, wherein the processing device determines that the second owner enters into the insurance contract based on receiving, through the communication device, a second approval signal indicating that the second owner approves of entering into the insurance contract.

10. The server according to claim 1, wherein
the vehicle is configured to communicatively connect with the cellular network,
the processing device is further configured to permit the second owner to use download software when permitting the update processing, and
the download software is software that is downloaded from the cellular network to the storage unit while the vehicle is being used by the first owner.

11. The server according to claim 1, wherein the processing device prohibits the update processing based on determining the second owner does not enter into the second lease contract.

12. The server according to claim 11, wherein the prohibiting the update processing restricts charging and discharging of the power storage device.

* * * * *